United States Patent
Iyer

(10) Patent No.: US 7,506,337 B2
(45) Date of Patent: Mar. 17, 2009

(54) SYSTEM AND METHOD FOR PROVIDING SERVICE OF AUTOMATED CREATION OF COMPUTER SOFTWARE PRODUCTION IMAGES

(75) Inventor: Krishnan P. Iyer, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 10/412,447

(22) Filed: Apr. 11, 2003

(65) Prior Publication Data

US 2004/0205748 A1  Oct. 14, 2004

(51) Int. Cl.
G06F 9/445 (2006.01)
G06F 15/177 (2006.01)

(52) U.S. Cl. ............... 717/177; 717/102; 717/103; 717/175; 713/1

(58) Field of Classification Search ............ 717/178, 717/174, 102, 101; 713/1; 705/29
See application file for complete search history.

(56) References Cited

U.S. PATENT DOCUMENTS

| | | | |
|---|---|---|---|
| 5,937,189 A | 8/1999 | Branson et al. | |
| 6,049,665 A | 4/2000 | Branson et al. | |
| 6,104,874 A | 8/2000 | Branson et al. | |
| 6,151,643 A * | 11/2000 | Cheng et al. | 710/36 |
| 6,381,742 B2 * | 4/2002 | Forbes et al. | 717/176 |
| 6,405,364 B1 * | 6/2002 | Bowman-Amuah | 717/101 |
| 6,658,644 B1 * | 12/2003 | Bishop et al. | 717/102 |
| 6,785,805 B1 * | 8/2004 | House et al. | 713/1 |
| 6,948,169 B1 * | 9/2005 | Amro et al. | 717/178 |
| 7,003,759 B2 * | 2/2006 | Jameson | 717/120 |
| 2003/0046681 A1 * | 3/2003 | Barturen et al. | 717/177 |
| 2003/0220853 A1 * | 11/2003 | Back et al. | 705/29 |
| 2004/0003388 A1 * | 1/2004 | Jacquemot et al. | 717/174 |

* cited by examiner

*Primary Examiner*—Tuan Q Dam
*Assistant Examiner*—Thuy Dao
(74) *Attorney, Agent, or Firm*—Workman Nydegger

(57) ABSTRACT

A subscription-based image pack service program provides the service of automated creation of computer software production images for different customers. To build a production image, a user interacts with the image pack service to enter selections of components and settings to be included in the production image. The image pack service automatically retrieves the selected components and builds the production image using the components. The image pack service keeps track of configuration information of the production image it has built, and notifies the user of recent changes/updates relating to the components and settings used in the production image. The user then decides whether the production image should be modified to incorporate the changes and, if so, uses the image pack service to generate the updated production image.

14 Claims, 3 Drawing Sheets

SYSTEM AND METHOD FOR PROVIDING SERVICE OF AUTOMATED CREATION OF COMPUTER SOFTWARE PRODUCTION IMAGES

TECHNICAL FIELD

This invention relates generally to the installation of software components on computers, and more particularly to a system and method for providing the service of automated creation of software production images in accordance with different requirements of customers.

BACKGROUND OF THE INVENTION

In large corporations or other types of organizations that each employs hundreds or thousand of computers, it is often desirable to ensure that all the servers or desktops are configured identically to ensure uniformity in the operations of the computers and to simplify the tasks of maintaining and trouble-shooting the computers. To that end, it is common for a corporation to install a uniform computer software image on all of their servers or desktop computers. Such a uniform software image, often called a "production image," typically includes the operation system, applications, hardware drivers, particular registry setting and other settings, etc. Because each corporation has its own particular needs and preferences, the production image has to be built around the different components selected to suit the requirements of that corporation. Today, it is typical for each of the corporations using production images to have its own internal team and internal procedures for building its production image, and for testing the image built by the team to ensure that the computer systems (server and desktop) in production are standardized and up to date. Each production image is typically built "manually" by the team by putting together all the required components to create the production image. Such a process can be very time consuming and expensive. Moreover, it is often difficult for the team responsible for developing the production image to learn about new changes/updates made to the components and settings used in the production image.

SUMMARY OF THE INVENTION

In view of the foregoing, the present invention provides a system and method for providing the service of automated creation of production images for different customers. To use the service, a customer has to first subscribe to the service. The service is implemented in an image pack service program. To build a production image, a user uses the user interface of the image pack service to select the components to be included in the production image. The image pack service then automatically retrieves the components and builds the production image using the components. The production image built by the image pack service can then be tested, modified, and finalized by the customer. The image pack service keeps track of the configuration information of the production image it has built, and notifies the user of recent changes/updates for the components and settings used in the production image. The user can then make the decision of whether to modify the existing production image to incorporate the changes.

DETAILED DESCRIPTION OF THE INVENTION

Figure 1:
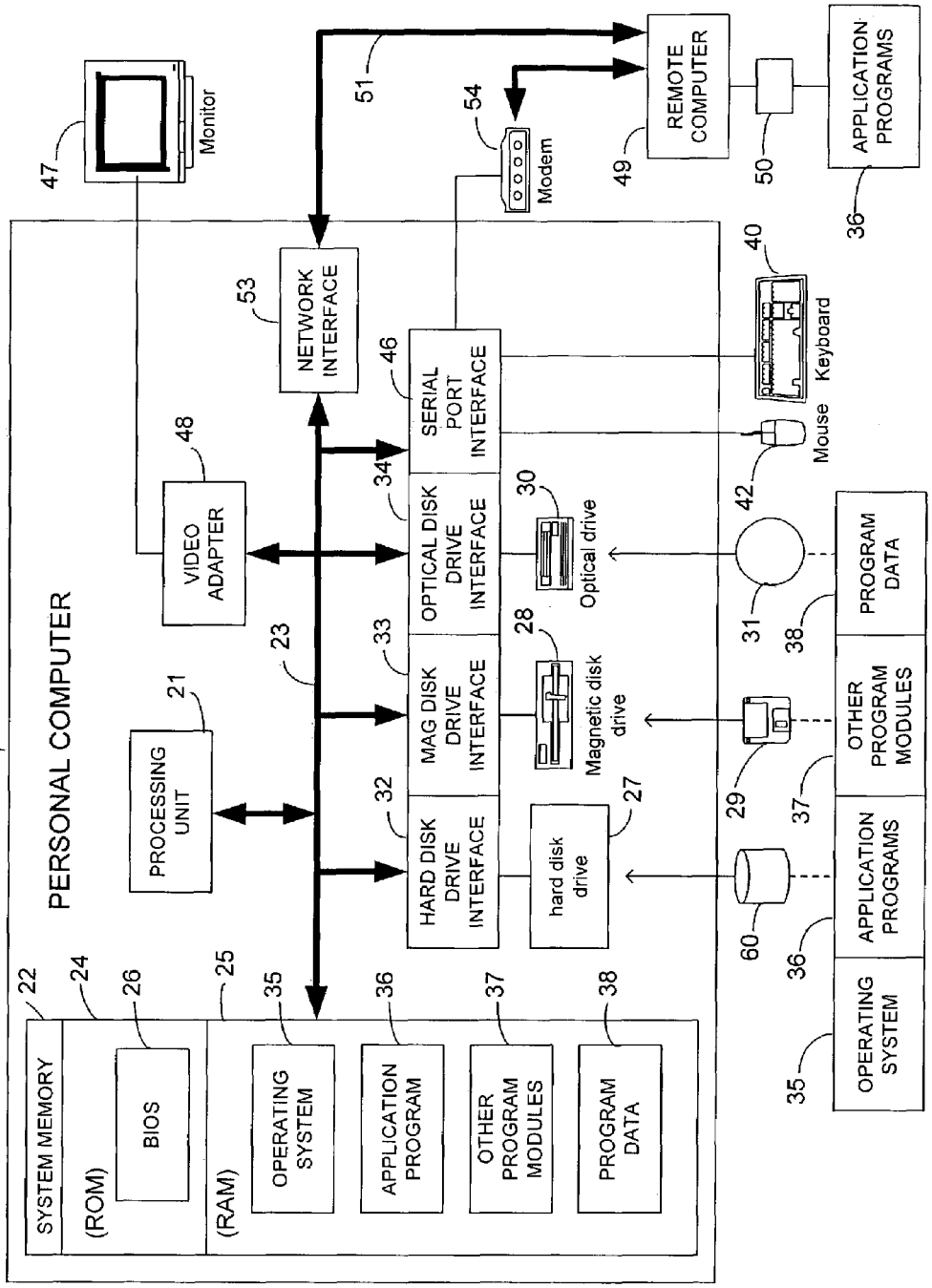
FIG. 1 is a block diagram generally illustrating an exemplary computer system on which an image pack service of the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used in an exemplary system for implementing the invention, and the image pack service of the invention will be described in greater detail with reference to FIGS. 2 and 3. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
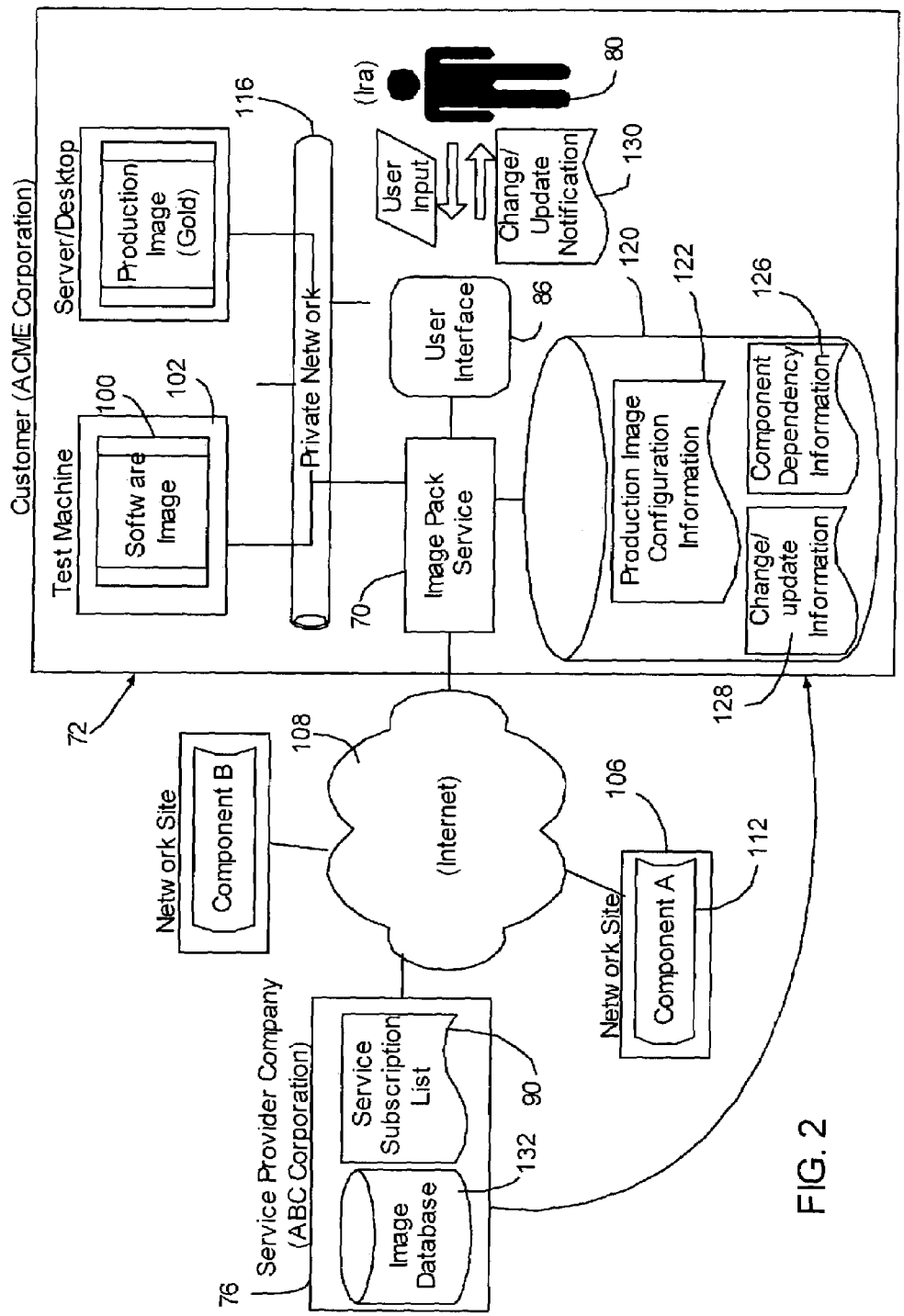
FIG. 2 is a schematic diagram showing an image pack service for automated generation of a production image tailored to the need of a customer.

Referring to FIG. 2, the present invention is directed to a system and method for providing the service of automated creation of computer software production images tailored to the different needs of different customers. As illustrated in FIG. 2, this service is embodied in an image pack service 70 that is provided to a customer 72 requiring such service. Depending on the business model employed, the image pack service 70 may be provided by the service provider company 76 to the customer if the customer subscribes to such service. To that end, the service provider company 76 maintains a subscription list 90.

To create a production image, a user 80 (e.g., an information technology professional ("ITPRO") at the customer company) uses a user interface 86 of the image pack service 70 to select components to be included in the production image and the settings of the components. The components may include, for example, the operating system (e.g., the Microsoft Windows operating system) to be used as the basic platform, the various service packs of the operating system, applications (e.g., Microsoft Exchange), service packs of the applications, hardware drivers specific to the hardware to be used by the customer, etc. After the user enters the selections of components and settings, the image pack service 70 creates a production image based on the user selections. In a preferred embodiment, the image pack service 70 automatically retrieves the components selected by the user, and uses the components to build the production image 100 on a selected machine 102. The component retrieval may involve, for instance, the access of a site 106 on a network 108 where a particular selected component 112 is stored. The network 108 may be, for instance, the Internet, where the location of that component is identified by a universal resource locator (URL). Additionally, the component may reside on the internal corporate network 116 of the customer organization. After retrieving the components selected by the user 80, the image pack service 70 builds the production image 100.

Producing a production image that can be used across the organization of the customer organization is typically an iterative process that requires testing and rebuilding the image (e.g., to include service packs) multiple times. Each time a component or setting has to be modified, the user 80 indicates the changes to the image pack service 70, which then builds a new version of the production image to incorporate the changes.

Figure 3:
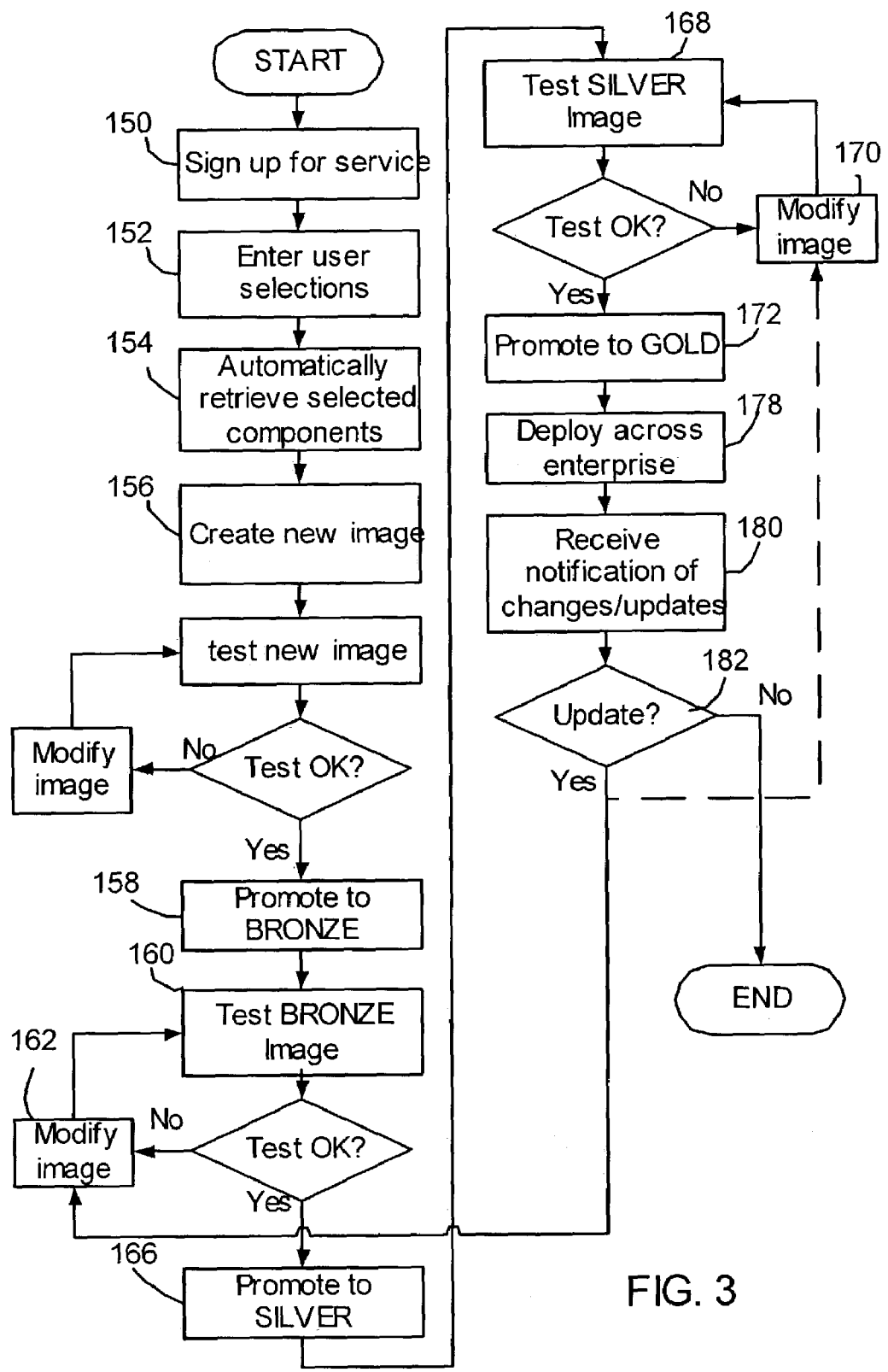
FIG. 3 is a flow diagram showing the process of a scenario that involves automated generation of a production image and the subsequent notification of changes that may require updates of the production image.

By way of example, a scenario is described herein in connection with FIG. 3 to illustrate how the image pack service 70 may be used to facilitate the development of a production image that can be deployed across the organization. In this scenario, a user "Ira" working for the customer organization, "Acme Corporation," is in charge of developing a new production image for the computers of Acme. Instead of manually building the production image as is conventionally done, Ira signs up (Step 150) for the image pack service with the service provider, "ABC Company." Ira decides to start the process of building the Bronze (Alpha) version of Acme's next production image for his server or desktop systems. Using the user interface 86 of the image pack service 70, Ira indicates (step 152) to the image pack service the following items: the version of the operating system, the versions of the service packs, specific "quick fix engineering" (QFE) packets that have been released after the service packs were installed on Acme's existing production servers, firmware updates from hardware vendors, updates to original equipment manufacturer (OEM) drivers, agents and utilities, updates to management and support tools from independent software vendors (ISVs), changes to default registry settings, and local security policy and core services configuration that are appropriate for Acme, etc. To reduce the amount of data the user has to enter to select the components, the image pack service may load the last-used Acme configuration as a guide and also any recommended default components and settings.

Ira realizes that Acme also uses a different monitoring application that is unique to Acme and there is an update to that package. Ira has tested that update package and feels confident about its stability. The image pack service 70 accepts "Additional Custom Contents," and Ira enters the location of the network site from which the new monitoring application update can be downloaded. Ira then clicks a button in the user interface 86 to initiate the build process. In response, the image pack service 70 automatically collects (step 154) all the above information from various locations that Ira has "approved," and then creates a production image from the components (step 156).

The image pack service 70 builds this production image 100 and makes it available on a shared machine 102 to be executed. Execution of this new production image 100 would perform checks to ensure that the hardware that the image is being run on is what the image pack service built it. If the new production image passes the checks, Ira then hands off this image pack as a Bronze version (step 158) to the internal testing team of Acme, which uses this image to test various applications, response, uptime etc. (step 160).

Based on test findings, Ira updates the configuration, settings and builds of the various components and uses the image pack service 70 to create (step 162) updates to the Bronze build of the production image. After a sufficient amount of testing, Ira's information technology group promotes the Bronze (Alpha) build to Silver (Beta) status (step 166) and shares it with other teams to test with their custom applications in their departments (step 168). Ira updates the configuration (step 170) again based on the testing feedback from the teams across the organization, and finally they put an escrow build image out as Gold production image (step 172). After the escrow period, the Gold image is installed on the production servers (step 178).

Referring back to FIG. 2, in accordance with a feature of the invention, the image pack service 70 not only builds the various versions of the production image based on the user's input, but also notifies the customer of updates/changes that may impact the production image currently used by the customer. To that end, in a preferred embodiment, the image pack service 70 maintains at the customer location a database 120 that stores information 122 about the production image, including the components used, their versions, and their respective settings. The database also includes information 126 about the dependency among the various components. The service provider company 76 (the ABC Corporation in the scenario) alerts the image pack service 70 of recent changes, such as new service packs, QFE packets, new settings, etc., by communicating with the image pack service over the network. When the image pack service receives the information 128 of such changes, it reviews the configuration information 120 about the production image of the customer, and determines whether the changes may be relevant to the production image. For example, one of the changes may be the default value of a particular setting that has been set to a different value in the production image 100. The image pack service 70 notifies the user 80 of the potentially relevant changes. In one embodiment, the notification 130 may be via an e-mail message, but other means of notification may be used. For instance, an alternative way to present the notification is to use the user interface to display an update alert for viewing by the user when the user logs in. If the user thinks that the changes should be implemented in the production image, the image pack service 70 is used to create a new version of the production image that incorporates the desired changes.

In an alternative embodiment, the information about the configuration of the production image of the customer is stored in a database 132 at the service provider company 76. To that end, the image pack service 70 transmits the configuration information of the production image it has created to the service provider company. In this embodiment, the notification 130 of the changes are generated at the service provider company, which then sends the notification over the network 108 to the image pack service, which then forwards the notification to the user 80.

Continuing the scenario from above, Ira gets an email notification 130 (step 180) from the image pack service that there has been an update to one of the components of the Gold production image that Acme has used to standardize their systems on. Ira logs on to the image pack service 70, which tells him via the user interface that there has been a new QFE or driver or ROM or ISV agent released that could change the GOLD configuration. Ira reviews the changes and the specific area that the new update modifies, and checks to see if that involves functionality that systems in Acme use. If Ira decides that the production image should be updated (step 182), Ira uses an option in the image pack service to create an "update" image that could be used to replace the existing GOLD image after adequate testing. He selects the option, and the image pack service 70 rebuilds the custom image pack for Acme. In doing so, the image pack service remembers/tracks the revisions numbers between the different GOLD images. Ira then releases this update image as a BRONZE (Alpha) or SILVER (Beta) image, depending on how much of a change the update has performed. After final testing and approval from other teams, Ira signs off this update image package as the GOLD package to replace the older GOLD package.

The service provider company may also provide the service of building the images for customers. To provide that service, the service provider company (the ABC Corporation, or "ABC," in the scenario) may be required to do a few things on the back end. Some of those are listed below, but it should be appreciated that the list is not exhaustive. Continuing the scenario, ABC first internally identifies several (e.g., 3-5) top standard hardware models within a vendor's product line that are used by customers who will subscribe to the service. ABC then creates images for the selected hardware models using the released updates for: N & N-1 version of the operating system; appropriate version of the Service Packs; versions of Security Rollup Packs; specific QFE packets that have been released since the last production update; firmware updates from the hardware vendor; updates to OEM drivers, agents and utilities; and changes to default registry settings, local security policy and core service configuration that are considered "best practices" overall or applicable to a general server type, like IIS or SQL. ABC tests this image to ensure that it works appropriately with the above platforms. Based on the pass criterion, the image pack service team at ABC may certify a build and the components to be stable. This is a requirement for the image and the components to be pushed out to the customer. This production image is then pushed to customers who have subscribed to the image pack service. Customers will then use this tested "image pack" and make minor modifications and then follow it up with their own internal testing.

The image pack service of the invention is expected to provide significant values to the customers. First, it reduces the cost of the customers in constructing the production images tailored to their needs by offloading much of the burden associated with developing and testing a production image for a standard hardware model within a vendor's product line. Second, the customers who subscribe to the service are kept current on any changes that might affect their production systems. Furthermore, it should be easier to maintain platform security, increase availability of a well-tested and holistically managed platform, and decrease administrative and operational burden with consolidated updates.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer program product for use at an organizational computer system, the organizational computer system communicatively coupled to an image pack service, the computer program product for implementing a method for automatically building a single production software image file from user selected software components so as to significantly reduce the resources expended by the organization to build a production software image file, the production software image file for distribution to any of a number of the organization's computer systems, the computer program product comprising one or more computer-readable storage medium having stored thereon computer-executable instructions that, when executed by a processor, cause the computer system to perform the following:

receive user input signing up an organization to subscribe with a service provider of an image pack service such that the organization can use the image pack service to automatically build production software image files tailored for installation on any number of the organization's computer systems based on components identified by the organization to the image pack service;

in response to receiving the user input, send subscription information to the service provider of the image pack service and receive authorization from the service provider to user the image pack service to build the production software image file;

the image pack service receiving, through a user-interface of the image pack service, user input selecting components for inclusion in a production software image file, the selected components including at least a computer operating system and one or more third-party software components that will run on the operating system along with configuration settings for the computer operating system and the one or more third-party software components, the user input identifying one or more network locations external to the organization for accessing the one or more third-party software components that are to be built into in the production software image file;

the image pack service automatically retrieving the selected components including retrieving the one or more third-party software components from the identified one or more network locations external to the organization in response to receiving the user input component selections at the user interface of the image pack service;

the image pack service automatically building a combination of the organizational computer operating system, the retrieved one or more third-party software components and the configuration settings for the computer operating system and the one or more third-party software components into a single production software image file in response to receiving the user input component selections at the user interface of the image pack service, the single production software image file tailored for installation on any of a plurality of the organization's existing production computer systems so as to facilitate a uniform configuration across the plurality of the organization's existing computer systems;

the image pack service notifying the user of one or more recommended changes that are to be made to the production software image file;

the image pack service receiving an indication from the user that the changes recommended by the image pack service are to be made to the production software image file; and the image pack service creating a new version of the production software image file that incorporates the recommended changes.

2. The computer program product as recited in claim 1, wherein computer-executable instructions that, when executed, cause the computer system to automatically build the organization's approved software components into the single production software image file comprise computer-executable instructions that, when executing by a processor, cause the computer system to build the single production software image file on a designated test machine.

3. The computer program product as recited in claim 1, further comprising computer-executable instructions that, when executed, cause the image pack service to:

maintain configuration information of the single production software image file in a database;

receive information regarding changes and updates available for the organization's selected components included in the single production software image file; and generate notification for notifying a user of the changes and updates available for the selected components included in the single production software image file.

4. The computer program product as recited in claim 3, wherein the database is located at the organization for which the single production software image file is built.

5. The computer program product as recited in claim 3, wherein the database is located at a service provider that provides the service of automated generation of computer production software image files, and further comprising computer-executable instructions that, when executed, cause the computer system to: transmit the configuration information of the single production software image file over a network to the service provider.

6. The computer program product as recited in claim 1, further comprising computer-executable instructions that, when executed, cause the computer system to:

install the single production software image file to a first computer system to facilitate uniform computer system configuration between the first computer system and other computer systems within the plurality of computer systems; and subsequently install the single production software image file to a second computer system to facilitate uniform computer system configuration between the second computer system and the first computer system.

7. The computer program product as recited in claim 1, further comprising:

receiving an indication that at least one of a component and a setting in the production image file is to be modified; and building a new version of the production image to incorporate the requested modifications.

8. The computer program product as recited in claim 1, further comprising loading the last-used configuration settings as a guide for selecting the components that are to be modified, such that the amount of data entered by the user to select the components is reduced.

9. At an organizational computer system communicatively coupled to a subscription-based service provider of an image pack service installed at the organizational computer system, a method of automatically building a production software image file from user selected software components so as to significantly reduce the resources expended by an organization to build a production software image file, the production software image file for distribution to the organization's computer systems, the method comprising:

receiving user input signing up an organization to subscribe to the image pack service such that the organization can use the image pack service to automatically build production software image files tailored for installation on any number of the organization's computer systems based on components identified by the organization to the image pack service;

in response to receiving the user input, sending subscription information to the service provider of the image pack service and receiving authorization from the service provider to user the image pack service to build the production software image file;

the image pack service receiving, through a user interface of the image pack service, user input selecting components for inclusion in a production software image, the selected components including at least a computer operating system, including a version of the computer operating system and versions of service packs and quick fix engineering (QFE) packets for the computer operating system, and one or more third-party software components that will run on the operating system along with configuration settings for the computer operating system and the one or more third-party software components, the user input identifying one or more network locations external to the organization for accessing third-party software components that are to be built into the production software image file;

the image pack service automatically retrieving the selected components including retrieving one or more third-party software components from the identified one or more network locations external to the organization in response to receiving the user input component selections at the user interface of the image pack service;

the image pack service automatically building a combination of the organizational computer operating system, the retrieved one or more third-party software components and the configuration settings for the computer operating system and the one or more third-party software components into a single production software image file in response to receiving the user input component selections at the user interface of the image pack service, the single production software image file for installation on any of a plurality of the organization's existing computer systems so as to facilitate a uniform configuration across the plurality of the organization's existing computer systems;

receiving, by the image pack service, a request to modify the single production software image file, the request corresponding to feedback from an iterative testing procedure for testing a single production software file within designated test machines within the organization;

rebuilding, by the image pack service, the single production software image file according to the request to modify the single production software image file;

the image pack service automatically tracking change/update information for the components built into the single production software image file in response to receiving the user input component selections at the user interface of the image pack service such that no subsequent interaction with the production computer systems is required to identify applicable updates to the selected components built into the single production software image file;

receiving information regarding changes and updates available for components built into the single production software image file;

the image pack service automatically generating notification for notifying the organization of one or more recommended changes and updates available for the components built into the single production software image file;

the image pack service receiving an indication from the user that the changes recommended by the image pack service are to be made to the production software image file; and the image pack service creating a new version of the production software image file that incorporates the recommended changes.

10. A method as in claim 9, wherein the step of generating notification includes comparing the information regarding the changes and updates with the configuration information of the single production software image file.

11. A method as in claim 9, wherein the notification is an e-mail message to representative of the organization indicating that changes and updates are available for software components built into the single production software image file.

12. An organizational computer system embedded in one or more computer-readable storage media, the system configured to manage automated generation of computer software production software image files, the system configured to automatically build production software image files from user selected software components for use on any number of computers within an organization so as to significantly reduce the resources expended by the organization to build a production software image file, the production software image file for distribution to the organization's computer systems, comprising:

an image pack service provided for use by a user of a customer organization for generating production software images for the customer organization, the image pack service being operable in connection with a subscription to a service provider of the image pack service and configured to perform the steps of:

receiving user input signing up an organization to subscribe to the service provider of the image pack service such that the organization can use the image pack service to automatically build production software image files tailored for installation on any number of the organization's computer systems and having components identified by the organization to the image pack service;

in response to receiving user input signing up the organization, sending subscription information to the service provider of the image pack service and receiving authorization from the service provider to user the image pack service to build the production software image file receiving, through a user interface of the image pack service, user input selecting components for inclusion in a production software image file, the selected components including at least a computer operating system and one or more third-party software components that will run on the operating system along with configuration settings for the computer operating system and the one or more third-party software components, the user input identifying one or more network locations external to the organization for accessing third-party software components;

automatically retrieve the selected components including one or more third-party software components from the identified one or more network locations external to the organization in response to receiving the user input component selections at the user interface of the image pack service;

automatically build a combination of the computer operating system, the one or more third-party software components and the configuration settings for the computer operating system and one or more third-party software components into a single production software image file in response to receiving user input component selections at the user interface of the image pack service, the single production software image file tailored for installation on any of a plurality of the organizations existing computer systems so as to facilitate a uniform configuration of the organization's third-party software components across the plurality of the organization's computer systems;

notify the user of one or more recommended changes that are to be made to the production software image file;

receive an indication from the user that the changes recommended by the image pack service are to be made to the production software image file; and create a new version of the production software image file that incorporates the recommended changes; and a database for maintaining configuration information of the user selected components built into the single production software image.

13. A system as in claim 12, wherein the image pack service is further configured to perform the steps of:

automatically tracking change/update information for the components built into the single production software image file in response to receiving the user input component selections at the user interface of the image pack service such that no subsequent interaction with the production computer systems is required to identify applicable updates to the selected components built into the single production software image;

receiving information regarding changes and updates available for approved components built into the single production software image filer; and generating notification for notifying a representative of the customer organization of the changes and updates.

14. A system as in claim 12, wherein the database is located at a service provider that provides the image pack service, and wherein the image pack service is programmed to transmit the configuration information over a network to the service provider.

* * * * *

UNITED STATES PATENT AND TRADEMARK OFFICE
CERTIFICATE OF CORRECTION

| | | |
|---|---|---|
| PATENT NO. | : 7,506,337 B2 | Page 1 of 1 |
| APPLICATION NO. | : 10/412447 | |
| DATED | : March 17, 2009 | |
| INVENTOR(S) | : Krishnan P. Iyer | |

It is certified that error appears in the above-identified patent and that said Letters Patent is hereby corrected as shown below:

In column 12, line 24, in Claim 13, delete "filer;" and insert -- file; --, therefor.

Signed and Sealed this
Third Day of May, 2011

David J. Kappos
*Director of the United States Patent and Trademark Office*